Dec. 16, 1969 W. C. BENZING 3,484,311

SILICON DEPOSITION PROCESS

Filed June 21, 1966

INVENTOR
WALTER C. BENZING
BY Leo A. Plum, Jr.
ATTORNEY

United States Patent Office 3,484,311

Patented Dec. 16, 1969

3,484,311

SILICON DEPOSITION PROCESS

Walter C. Benzing, Saratoga, Calif., assignor to Union Carbide Corporation, a corporation of New York Filed June 21, 1966, Ser. No. 559,326
Int. Cl. H01l 7/36
U.S. Cl. 148—174 11 Claims

ABSTRACT OF THE DISCLOSURE

Process for forming a continuous coating of silicon upon an inert substrate by contacting the substrate with a mixture of silane and hydrogen at an elevated temperature thereby depositing polycrystalline silicon on the substrate and thereafter contacting the substrate with a heat decomposable silicon halide to continue the growth of polycrystalline silicon.

This invention relates to a process for depositing silicon and more particularly to a process for depositing silicon on surfaces of bodies used in fabricating semiconductor devices.

In the fabrication of semiconductor devices as well as other electronic devices it often is desirable to employ a layer of silicon on a previously formed inert substrate. For example, in the practice of the method of dielectric isolation, it is necessary to deposit polycrystalline silicon over a thin silicon dioxide film overlying and defining a grooved surface of a monocrystalline silicon wafer. The formation of such a polycrystalline silicon back-up layer on the glassy silicon dioxide surface is extremely difficult and it is believed that the inability to readily form the proper silicon layer has to some extent held up the realization of the full potential of the dielectric isolation techniques.

The problem has been analyzed as being due to a lack of suitable nucleation sites on the smooth silicon dioxide substrate for the deposition of silicon from vaporous compounds such as the silicon halides. Attempts have been made to treat the surfaces of such substrates to create nucleation sites and thus promote the deposition of a uniform coating of silicon from silicon halides. Examples of such techniques involve the use of caustic etching of the oxide surface, or the predeposition of a contaminating agent such as photoresist. Another process involves the simultaneous deposition of silicon carbide with the silicon material to cause a continuous formation of nuclei and a uniform deposition of silicon.

Such processes as those outlined above, often involving the use of contaminating agents, are not completely acceptable and there is a need for a method of forming a polycrystalline silicon deposit on inert surfaces which do not readily permit uniform nucleation of vapor deposited silicon.

It is the object of this invention therefore to provide a process for depositing uniform, continuous coatings of silicon over inert surfaces of a substrate body.

It is also an object of this invention to provide a process for depositing uniform, continuous coatings of silicon over inert substrates which do not otherwise permit uniform nucleation of vapor deposited silicon.

It is a particular object of this invention to provide an improved process for depositing silicon coatings over silicon dioxide surfaces.

Other aims and advantages of this invention will be apparent from the following description, the appended claims and the attached drawings.

In accordance with these objects a process is provided for forming a uniform, continuous coating of silicon upon an inert substrate, for example a smooth glassy silicon dioxide surface, comprising maintaining the surface to be coated at a temperature from about 700° C. to about 1300° C., and contacting said surface with a mixture of silane ($SiH_4$) and hydrogen, thereby depositing silicon material onto said surface.

The process involves gas reactions in a flowing system and the molecular ratio of silane to hydrogen should be from about 1:50 to 1:5000. The flow rate can be varied to produce deposition rates of from about 0.02 to about 2$\mu$ per minute. In another embodiment of the process, the surface of the substrate to be coated is maintained at a temperature from about 700° C. to about 1300° C. within a closed reaction vessel, and contacted with a stream of silane in hydrogen, the molecular ratio of silane to hydrogen being from about 100:1 to 1:10 with a pressure in the reaction vessel of from about 50 mm. to about 0.1 mm. of mercury. The flow rate of the silane-hydrogen stream can be varied to give deposition rates of from about 0.01 to about 1$\mu$ per minute.

Uniform and continuous coatings of silicon can be deposited on inert substrates by the process of this invention. The previous practices of attempting the deposition of silicon upon such surfaces by the thermal decomposition of silicon halides resulted in only non-uniform depositions randomly situated over the substrate. Further deposition of silicon from the silicon halide streams resulted in a build-up of silicon on the existing uneven deposits without accomplishing a complete initial covering of the substrate surface itself. This was due, as previously set forth, to the fact that smooth, glassy silicon dioxide surfaces do not permit uniform nucleation of silicon from such vapor phases as are formed by the silicon halides. It has been found that the deposition of silicon from silicon tetrachloride ($SiCl_4$), for example, actually involves the formation of a dihalide intermediate ($SiCl_2$), which is the true deposition agent. It is the inability to form the dihalide on smooth inert surfaces that prevents the formation of a continuous silicon layer. A uniform coating of silicon cannot then be grown over the whole of the substrate surface and the resulting coating is found to be uneven with voids and other discontinuities therein. Using the silane source material of this invention, continuous and uniform coatings of silicon can be deposited because the thermal decomposition of the silane to silicon does not involve the formation of any intermediate compounds. The coatings formed by the process of this invention are generally composed of uniform microcrystals or grains of silicon compared to the large, uneven grains formed by other processes.

After an initial coating of silicon is deposited using the silane-hydrogen process of this invention, additional silicon can be deposited to provide a thicker layer or coating by using the silane material and process or by substituting the conventional silicon halide source materials for the silane to give a somewhat increased deposition rate. The invention therefore includes the steps of discontinuing the flow of silane in hydrogen after an initial deposit of silicon is formed over the surface of the substrate and substituting a contacting stream of a silicon halide and hydrogen while maintaining the surface at a temperature of from about 1000° C. to about 1300° C. Examples of silicon halides suitable for this deposition are the chlorosilanes $SiH_2Cl_2$, $SiHCl_3$ and $SiCl_4$, as well as any other suitable silicon compound. Using $SiCl_4$ in hydrogen at a molar ratio of 1:50 with a substrate maintained at about 1100° C., a deposition rate of about 1.5 to 2.5$\mu$ per minute is suitable. It is to be understood that the deposition of silicon upon inert surfaces can be accomplished with these silicon halide sources only because a layer of silicon has already been deposited using the silane source material. While all of these silicon sources, the silane as well as the silicon halides, can be used to deposit silicon on existing silicon surfaces, or other rough active surfaces, only the silane can be used to deposit silicon on the inert surfaces contemplated here. The term inert surfaces therefore is meant to include those surfaces which do not permit uniform nucleation of silicon, and which inhibit the deposition of silicon from those compounds, such as $SiCl_4$, requiring the formation of intermediate deposition agents. An example of such an inert surface is a clean, smooth glassy silicon dioxide surface. Other surfaces which can be inert are quartz, alumina, porcelain and other similar materials, depending on the condition of the surface and the pretreatment to which it is subjected. It is an advantage of this invention that no pretreatment of such inert surfaces, using contaminants for example, is necessary when using the silane source material as in the process set forth here.

The invention will be further explained by reference to the drawings wherein.

Figure 1:
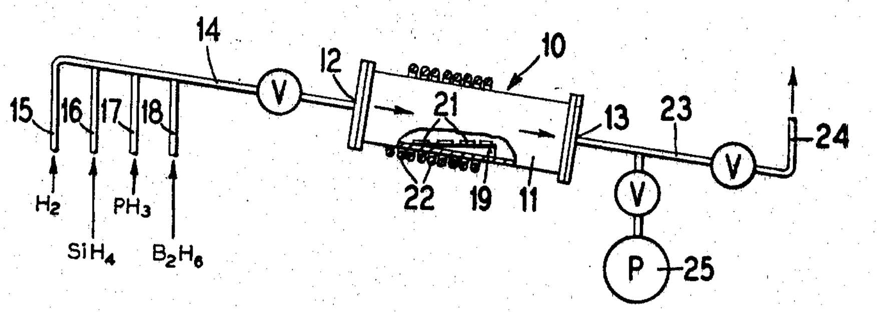
FIG. 1 is a schematic elevational view of one apparatus suitable for use in practicing the process of this invention.

Referring to FIG. 1 a horizontal type "cold wall" reaction vessel 10 is shown consisting of a metal or quartz tube 11 suitably closed at its ends with provision for a gas inlet at 12 and an outlet at 13. An inlet pipe 14 serves as a manifold for the mixing of pure silane from a conduit 15, pure hydrogen from conduit 16 and other gases from conduits 17 and 18 as needed. Mounted within the reaction vessel is a boat 19 composed of graphite on which are supported one or more wafers 21 of oxide covered silicon for example—the inert substrates. A RF heater coil 22 surrounds the vessel and provides the means for heating the substrates to the necessary temperatures. The gas mixture flows through the vessel passing over and contacting the surface of the substrate and the reaction products flow out the outlet 13 through tube 23 to a vent 24. Vacuum pump means 25 are connected to the outlet tube to reduce the pressure in the reaction vessel when needed.

The reaction vessel may have a diameter of about 2½ inches in which case of flow of about 15 liters per minute of a dilute stream of silane in hydrogen would give a silicon deposition rate of about 0.1$\mu$ per minute. The deposition rate can be varied by varying the temperature and flow rate of the reactants. The thickness of the coating deposited is then a function of the duration of treatment.

The practice of the invention is not limited to the use of the horizontal type apparatus shown. Other types of systems, including the vertical reactor arrangement, are suitable as are other arrangements of heating means, substrate support, gas manifolding and venting. Additionally while not further discussed here, valves are situated where needed and meters are located in the conduits 15, 16, 17 and 18 to control the flows of the various gases and to form the proper concentrations of constituents entering the reaction vessel.

Doping of the growing silicon can be accomplished by adding volatile doping compounds to the stream of silane and hydrogen, or to the stream of silicon halides and hydrogen. Suitable compounds for this purpose are phosphine ($PH_3$), diborane ($B_2H_6$) or arsine ($AsH_3$). In this way the electrical characteristics of the deposited silicon can be modified. The dopant compounds can be added to the silicon compound-hydrogen stream in concentrations of $10^{-2}$ to $10^{-6}$ mole percent.

Figure 2:
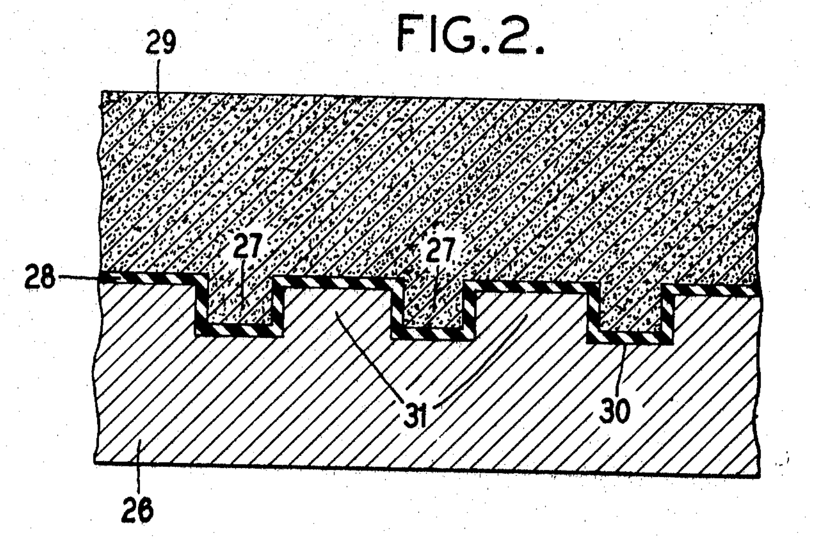
FIG. 2 is a schematic elevational view in cross section of one application of the coatings produced by the process of this invention.

FIG. 2 shows a typical application of the silicon coatings formed by the process of this invention. A portion 26 of a monocrystalline silicon wafer is shown with channels 27 formed therein. A silicon dioxide coating 28 has been formed over the surface of the silicon. This smooth, glassy silicon dioxide surface forms the inert substrate on which a layer 29 of polycrystalline silicon has been deposited using the process of this invention. The monocrystalline silicon can now be removed by lapping down to the edge 30 of the silicon dioxide coating to leave a structure consisting of a group of islands 31 of monocrystalline silicon surrounded on the sides and bottom by a layer of silicon dioxide and supported in a body of polycrystalline silicon 29. Semiconductor devices and other active or passive devices can be formed in the isolated monocrystalline islands.

The above described structure is only one example of a use of the silicon coatings formed by the process of this invention. It will be understood by those skilled in the art that the silicon layers formed according to this process can be used in the fabrication of all manners of electronic devices and that the use therein of the silicon deposition techniques disclosed herein is within the scope of this invention.

What is claimed is:

1. A process for forming a uniform, continuous coating of polycrystalline silicon upon an inert substrate comprising maintaining said substrate at a temperature from about 700° C. to about 1300° C. and contacting said substrate with a flow of a mixture of silane and hydrogen, thereby depositing polycrystalline silicon material onto said substrate and thereafter discontinuing the flow of silane and contacting the substrate with a heat decomposable silicon halide compound to continue the growth of polycrystalline silicon.

2. The process as set forth in claim 1 in which a stream of silane in hydrogen is passed over the substrate, the molecular ratio of silane to hydrogen being from about 1:50 to 1:5000.

3. The process as set forth in claim 1 in which a stream of silane in hydrogen is passed over the heated substrate in a closed reaction vessel maintained at a reduced pressure less than ambient, the molecular ratio of silane to hydrogen being from about 100:1 to 1:10.

4. The process as set forth in claim 3 in which the reduced pressure is from about 50 mm. to about 0.1 mm. of mercury.

5. The process as set forth in claim 1 in which a stream of a silicon halide in hydrogen is passed over the substrate while the substrate is maintained at a temperature from about 1000° C. to about 1300° C.

6. The process as set forth in claim 1 in which silicon tetrachloride in hydrogen is passed over the substrate, the molecular ratio of silicon tetrachloride to hydrogen being about 1:50 with the substrate maintained at a surface temperature of about 1100° C.

7. The process as set forth in claim 1 in which the deposition of polycrystalline silicon is continued to form a coating of a desired thickness.

8. The process as set forth in claim 1 in which the reduced pressure is from about 50 mm. to about 0.1 mm. of mercury.

9. The process as set forth in claim 1 in which a silicon halide selected from the group consisting of $SiH_2Cl_2$, $SiHCl_3$ and $SiCl_4$ is passed over the surface while said surface is maintained at a temperature from about 1000° C. to about 1300° C.

10. The process as set forth in claim 1 in which a gaseous dopant compound is added to the stream of silane and hydrogen to deposit dopant materials in the polycrystalline silicon coating.

11. The process as set forth in claim 1 in which a gaseous dopant compound is added to a stream of silicon halide and hydrogen to deposit dopant material in said coating.

References Cited

UNITED STATES PATENTS

| | | | |
|---|---|---|---|
| 3,165,811 | 1/1965 | Kleimack et al. | 148—175 XR |
| 3,173,814 | 3/1965 | Law | 148—175 |
| 3,177,100 | 4/1965 | Mayer et al. | 148—175 |
| 3,332,137 | 7/1967 | Kenney | 29—577 XR |
| 3,393,349 | 7/1968 | Huffman | 29—577 XR |

L. DEWAYNE RUTLEDGE, Primary Examiner
PAUL WEINSTEIN, Assistant Examiner

U.S. Cl. X.R.

29—577; 117—106, 201, 212; 148—115, 175